US008671114B2

(12) United States Patent
Fischer

(10) Patent No.: US 8,671,114 B2
(45) Date of Patent: Mar. 11, 2014

(54) SEARCH RESULTS WEIGHTED BY REAL-TIME SHARING ACTIVITY

(75) Inventor: Donald Fischer, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 657 days.

(21) Appl. No.: 11/564,986

(22) Filed: Nov. 30, 2006

(65) Prior Publication Data

US 2008/0133495 A1 Jun. 5, 2008

(51) Int. Cl.
*G06F 17/00* (2006.01)

(52) U.S. Cl.
USPC .......... 707/790; 707/687; 707/705; 707/813; 707/821; 707/608

(58) Field of Classification Search
USPC ......... 707/726, 793, 800, 805, 807, 608, 687, 707/705, 790, 813, 821
See application file for complete search history.

(56) References Cited

U.S. PATENT DOCUMENTS

| | | | |
|---|---|---|---|
| 6,493,703 B1 | 12/2002 | Knight et al. | |
| 6,778,982 B1 | 8/2004 | Knight et al. | |
| 6,847,969 B1 | 1/2005 | Mathai et al. | |
| 7,873,572 B2 * | 1/2011 | Reardon | 705/39 |
| 8,010,458 B2 * | 8/2011 | Galbreath et al. | 705/319 |
| 2002/0156635 A1 | 10/2002 | Nils | |
| 2002/0165936 A1 | 11/2002 | Alston et al. | |
| 2005/0097089 A1 | 5/2005 | Nielsen et al. | |
| 2005/0144158 A1 | 6/2005 | Capper et al. | |
| 2006/0026147 A1 | 2/2006 | Cone et al. | |
| 2006/0031197 A1 | 2/2006 | Oral et al. | |
| 2006/0031198 A1 | 2/2006 | Newbold et al. | |
| 2006/0053092 A1 | 3/2006 | Foo et al. | |
| 2006/0122979 A1 | 6/2006 | Kapur et al. | |
| 2006/0282416 A1 | 12/2006 | Gross et al. | |
| 2007/0124401 A1 | 5/2007 | Gillespie et al. | |
| 2007/0198485 A1 | 8/2007 | Ramer et al. | |
| 2008/0005064 A1 * | 1/2008 | Sarukkai | 707/3 |
| 2008/0010294 A1 | 1/2008 | Norton et al. | |
| 2008/0015878 A1 | 1/2008 | Feng et al. | |
| 2008/0194233 A1 | 8/2008 | Henry | |
| 2008/0215623 A1 | 9/2008 | Ramer et al. | |
| 2008/0235187 A1 | 9/2008 | Gade et al. | |
| 2008/0319943 A1 | 12/2008 | Fischer | |
| 2009/0063448 A1 | 3/2009 | DePue et al. | |

OTHER PUBLICATIONS

Red Hat Office Action for U.S. Appl. No. 11/765,288 mailed Jun. 8, 2009.
Red Hat Office Action for U.S. Appl. No. 11/765,288 mailed Mar. 19, 2010.
USPTO; Office Action for U.S. Appl. No. 11/765,288 mailed Oct. 10, 2012.
USPTO, Final Office Action for U.S. Appl. No. 11/765,288 mailed Apr. 30, 2013.
USPTO, Advisory Action for U.S. Appl. No. 11/765,288 mailed Jul. 25, 2013.

* cited by examiner

*Primary Examiner* — Sana Al Hashemi
(74) *Attorney, Agent, or Firm* — Lowenstein Sandler LLP

(57) ABSTRACT

Embodiments of the present invention provide a mechanism for weighting search results based on active and passive sharing activity among users in the context of a social network. In particular, information being shared among users is monitored. When a search is requested by a user, information recently shared among a user's social network is consulted and is used to weight the search results in the relevance calculation. For example, sharing activity that occurred recently or ongoing is used to weight the search results.

36 Claims, 4 Drawing Sheets

SEARCH RESULTS WEIGHTED BY REAL-TIME SHARING ACTIVITY

DESCRIPTION OF THE INVENTION

1. Field of the Invention

The present invention relates to online services and communications tools and, more particularly, to social networks. The present invention also relates to search.

2. Background of the Invention

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multi-media or popular culture, such as television, film, music, etc. These sites and their features are designed to keep users clicking on advertising-supported pages of the site. Thus, the known social networking sites employ a closed platform of services that attempt to keep their user-base captive to the site.

One prominent feature of online sites including social networking sites is providing search results. Unfortunately, given the vastness of the Internet, it is difficult to obtain relevant search results. Often, search results are of little or no interest to the user.

Accordingly, it would be desirable provide methods and systems for providing relevant search results.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a mechanism for weighting search results based on active and passive sharing activity among users in the context of a social network. In particular, information being shared among users is monitored. When a search is requested by a user, information recently shared among a user's social network is consulted and is used to weight the search results in the relevance calculation. For example, sharing activity that occurred recently or ongoing is used to weight the search results.

Reference will now be made in detail to the exemplary embodiments of the invention, which are illustrated in the accompanying drawings. Wherever possible, the same reference numbers will be used throughout the drawings to refer to the same or like parts.

Figure 1:
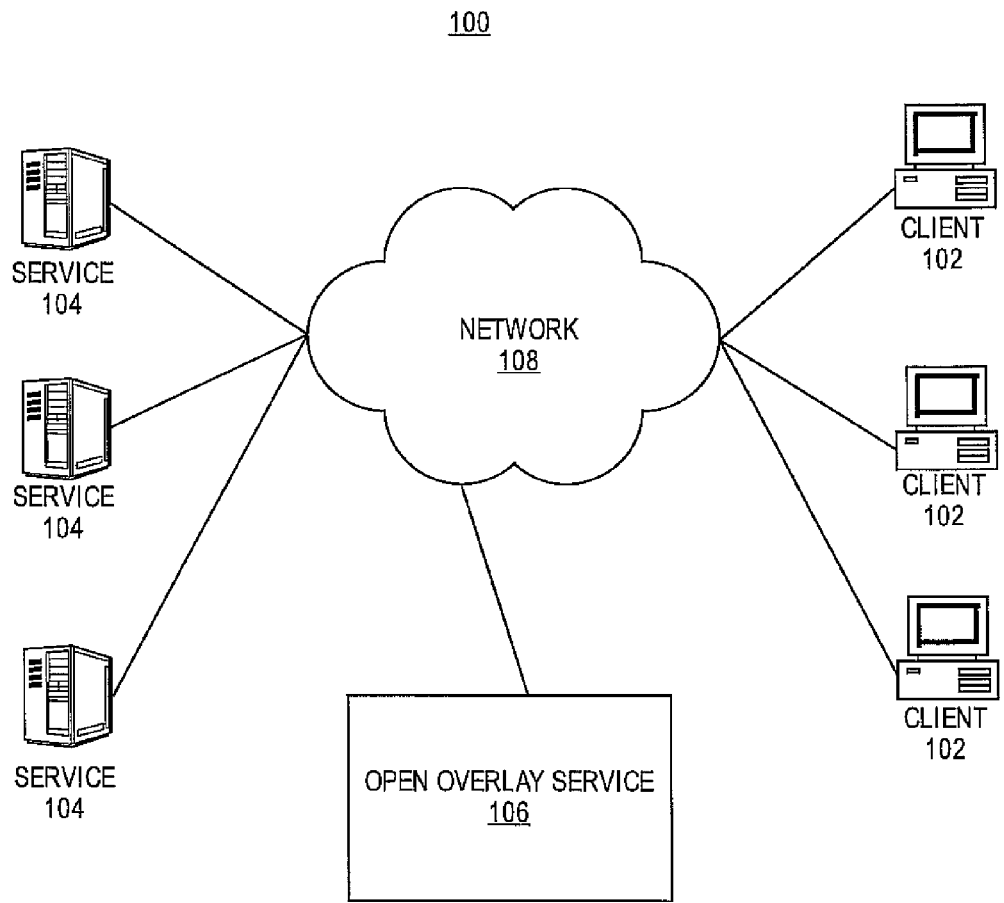
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
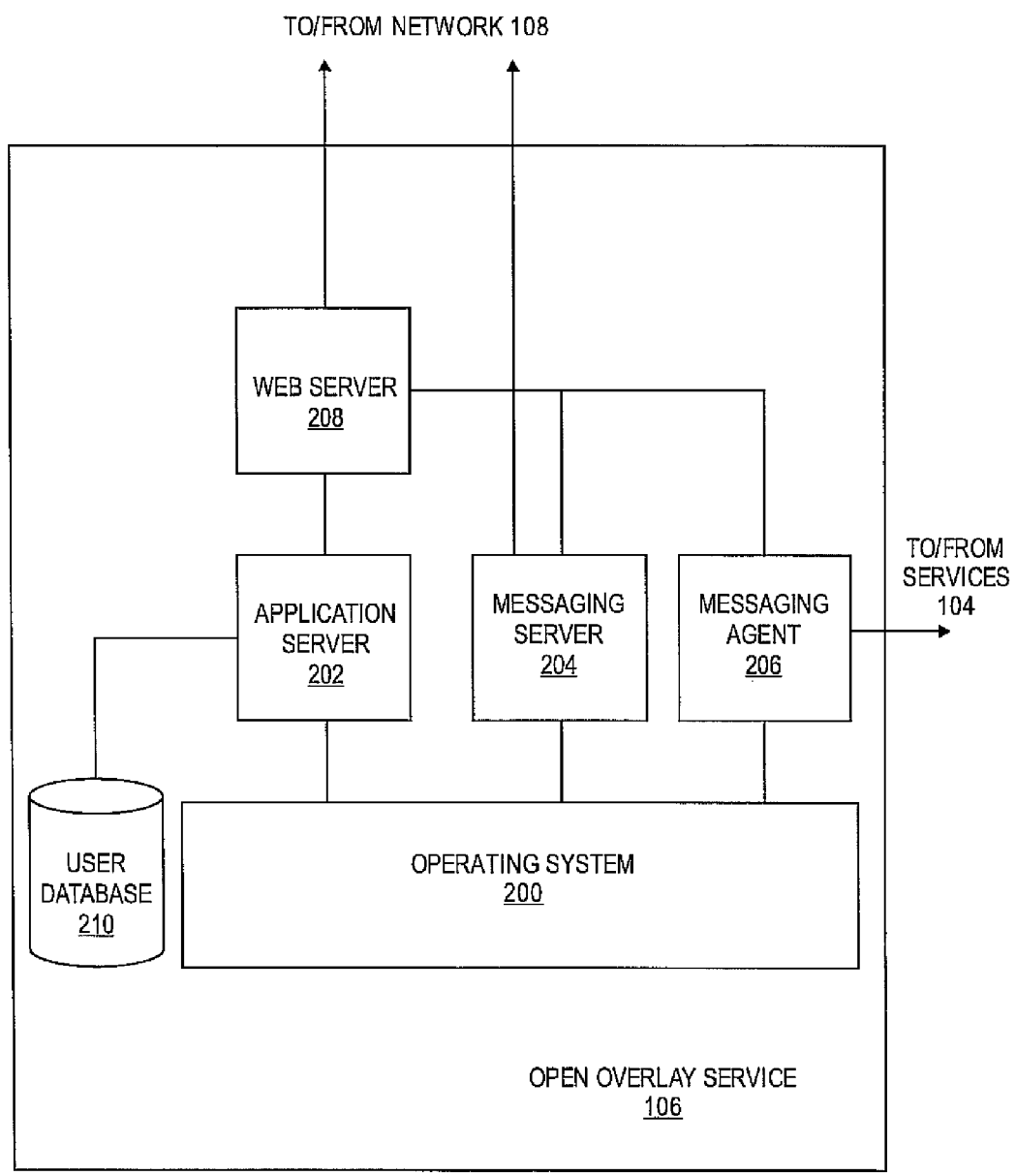
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
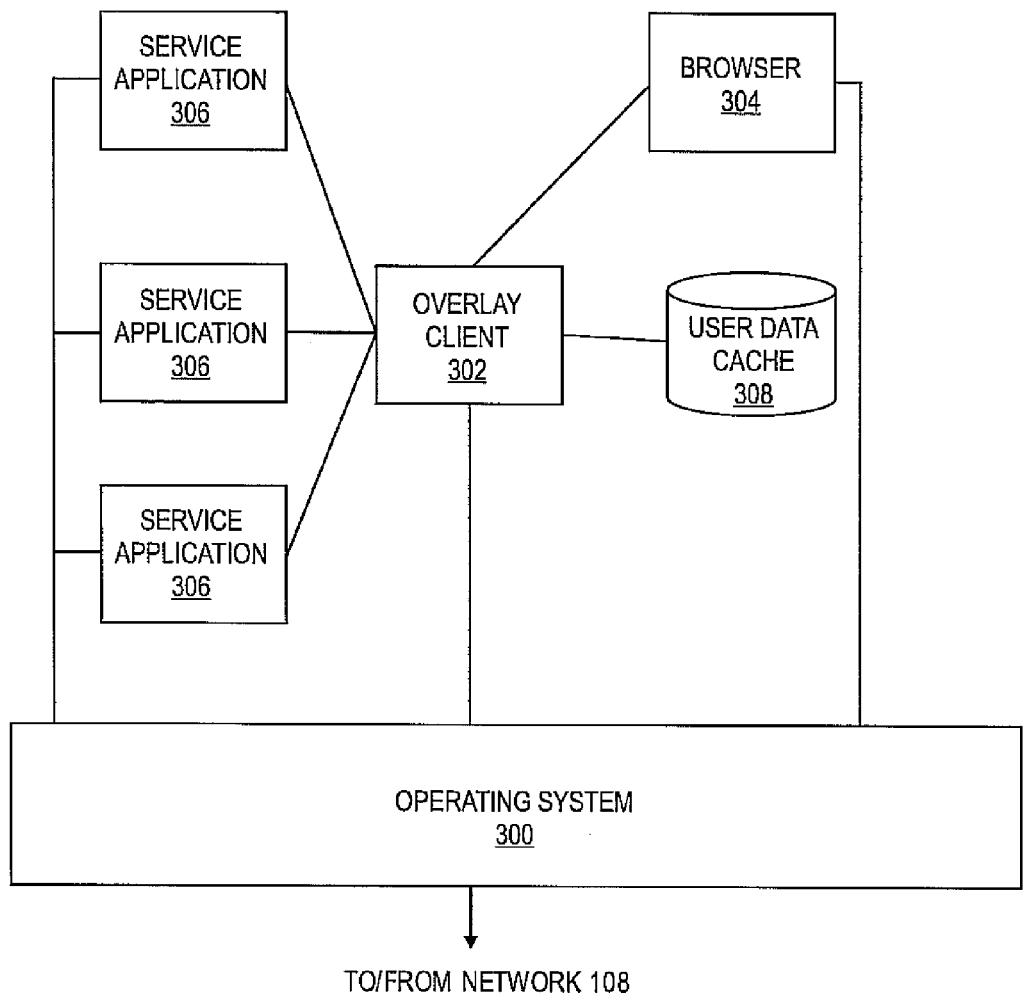
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

Figure 4:
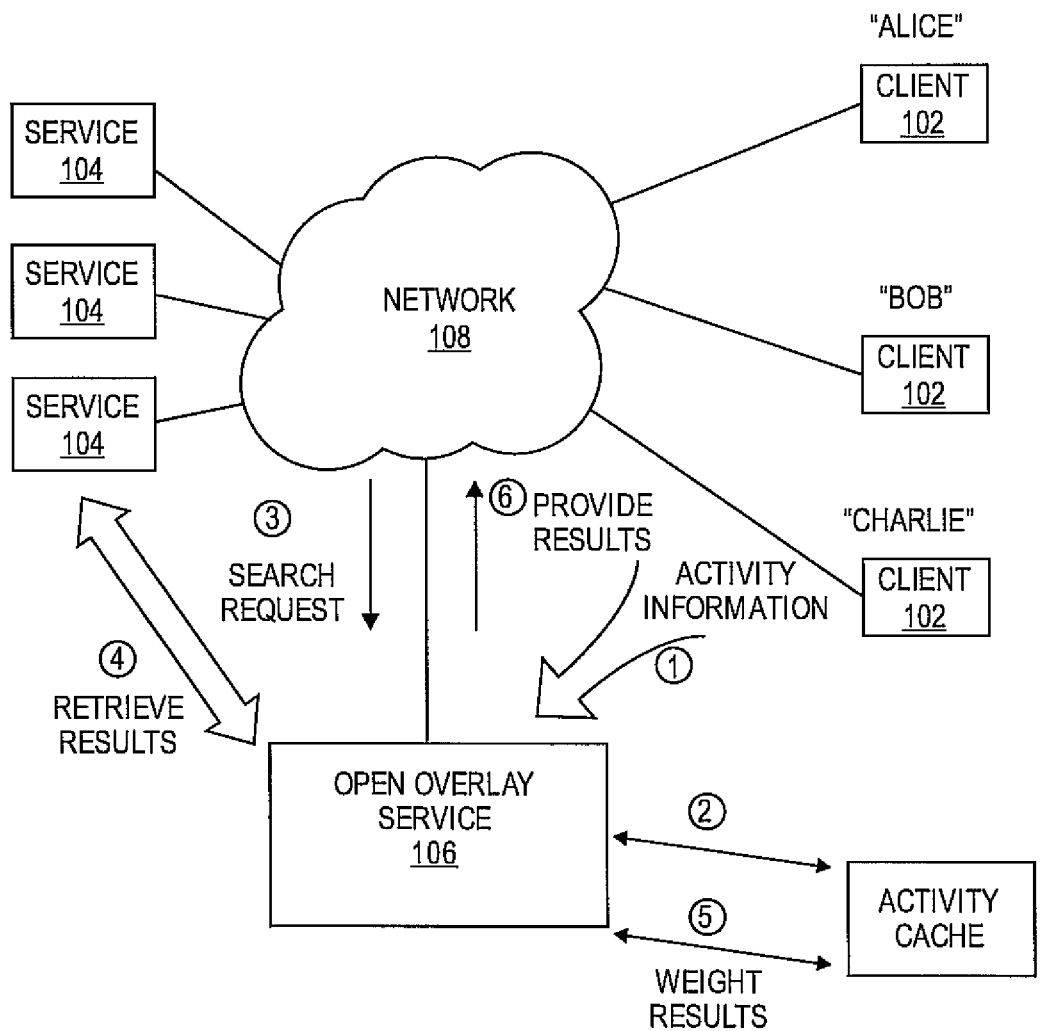
FIG. 4 illustrates an exemplary feature of the open overlay service for providing weighted search results.

In order to illustrate some of the features of open overlay service 106 that provide a live social context, several examples of features will now be described. FIG. 4 illustrates an exemplary feature of the open overlay service for providing relevant search results in a social network context. In particular, open overlay service 106 may receive various search requests and weight the results based on sharing activity of the user's social network.

Open overlay service 106 may weight search results to links that have been recently shared publicly by users. For example, a video clip on Google or YouTube that is being actively shared is weighted more preferentially than other sites or results. Open overlay service 106 may add that link to its index before it otherwise would crawl to it. Alternatively, open overlay service 106 may show this link in a separate section on the search results page Initially and continuously, open overlay service 106 monitors the sharing of its users and their social networks. Such behavior may be indicated based on search requests, sharing activity, and the like. This sharing behavior may be actively or passively monitored. Active monitoring is where open overlay service 106 prompts the user or invites the user to highlight a particular sharing activity of high or low interest.

Passive monitoring is where open overlay service 106 merely monitors the sharing activity and does not intercede in any of the user's activity.

In some embodiments, open overlay service 106 retrieves sharing information based on data held in cache 308 in clients 102 in addition to monitoring the activity of clients 102 with application server 102. In contrast to known search techniques, open overlay service 106 populates and weights its suggestions based on feedback from the social network. This feature allows the search results to be more accurate and more relevant to a user.

For example, over time, open overlay service 106 may keep track in database 210 of what the users watch and create sharing of content based on that history. Open overlay service 106 also lets users explicit highlight shared content with each other and tracks the following actions of the recipient. Hence, open overlay service 106 may gradually learn which sharing activity is highly relevant or not relevant.

Open overlay service 106 may publish recent sharing activity publicly to all or most of the users or only to the group. Open overlay service 106 may publish this information on a small scale, or a larger scale.

For purposes of illustration, FIG. 4 shows a scenario where clients 102 are labeled "Alice", "Bob" and "Charlie" and are members of the same social network and use open overlay service 106. Alice, Bob, and Charlie may interact with each other and share content with each other. As noted, the sharing activity of Alice, Bob, and Charlie may be collected actively or passively.

Clients 102 then send this sharing information to open overlay service 106. Open overlay service 106 may, for example, periodically poll for this preference data from clients 102. Alternatively, clients 102 may be configured to provide their sharing data at defined intervals or in real-time as it's collected.

In addition, open overlay service 106 may collect sharing information, such as cookies, etc., from the various providers via service 104. This information allows open overlay service 106 to correlate and aggregate the various browsing and sharing activities across many sites on network 108.

Open overlay service 106 may aggregate the sharing data, either at a central location (such as an activity cache) in database 210 or at multiple locations, such as service application 104. The aggregation could be done at a small scale ("sharing among my friends") or a larger scale ("sharing among all users") within open overlay service 106.

Application server 202 may then process the sharing data collected from clients 102 and program information 404 to determine a social network context that are of high or low interest to the users. Application server 202 may determine different sharing contexts for different social networks. For example, application server 202 may determine social network sharing contexts for different families or groups of friends. This allows open overlay service 106 to provide distinct search results among different social networks (even if the search is for the same item).

During operation, Alice, Bob, or Charlie may submit a search request. This search request may be submitted via open overlay client 302 or intercepted as a search request to another search engine, such as Google or Yahoo. Application server 202 then determines or receives the search results. In response to these results, application server 202 references the sharing data and social network context of the requesting user and highly weights the results based on that context.

For example, application server 202 may use various weighting factors or statistical techniques to filter the recommendations based on social networking context of the user. In addition, application server 202 may weight the social networking context based on time. For example, if the user's social network recently focused on travel and golf to a certain location, then application server 202 may upgrade search results for golf or that location, especially if they originate from within the social network. As another example, application server 202 may weight various search results based on the proximity of the search request to sharing activity within the social network. In some embodiments, search results submitted in close proximity or concurrently with sharing activity may be heavily weighted. Likewise, search results may be less weighted by sharing activity that occurred significantly before the search request. Of course, the user may also explicitly link the search request to a particular episode of sharing activity. Accordingly, application server 202 will weight the search results based on this request by the user.

Of note, different social networks may have different contexts. For example, one social network may have sharing activity to golf in the United States, while another social network may have sharing activity to golf in Mexico. Hence, open overlay service 106 is configured to weight the search results differently even if the general search request of "golf" is made by both groups. In response, the first social network will have results weighted to the United States golf, while the other will have results weighted to golf in Mexico. One skilled in the art will see that many variations are within the principles of the present invention.

Clients 102 may also selectively choose search results from open overlay service 106. This feature allows various social networks to selectively choose which search results they receive. For example, sports shows may be of interest to one group of users or social network. In contrast, content with a particular actor or musical group may be of interest to another group of users or social network.

Application server 202 may also filter the search results at clients 102 based on that client's profile or other criteria. For example, application server 202 may filter search results sent to Alice based on various criteria, such as Alice's age, Alice's location, Alice's other activities in open overlay service 106 as indicated in cache 308, etc. For example, search results for content that contains adult material may be filtered from being sent to Alice.

Furthermore, application server 202 may send various accompanying information with the search results. For example, this accompanying information may be information that indicates the number of users that made the same or similar search request, timing information about its relevance to recent sharing activity, and the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving a search request from a user in a network;
   determining a search result for the search request, the search result comprising a set of resources;
   determining, by a processor, a sub-set of the set of resources, where each resource in the sub-set was previously shared by at least one other user in the network, where a first user shares a resource in the sub-set by directly addressing a second user;
   weighting the sub-set of the set of resources, in view of how recently each resource in the sub-set was previously shared, as having a higher relevance than other resources of the search result to generate a weighted search result; and providing the weighted search result to the user.

2. A non-transitory computer-readable storage medium storing instructions which, when executed, cause a processor to perform operations comprising:

receiving a search request from a user in a network;
determining a search result for the search request, the search result comprising a set of resources;
determining, by the processor, a sub-set of the set of resources, where each resource in the sub-set was previously shared by at least one other user in the network, where a first user shares a resource in the sub-set by directly addressing a second user;
weighting the sub-set of the set of resources, in view of how recently each resource in the sub-set was previously shared, as having a higher relevance than other resources of the search result to generate a weighted search result; and
providing the weighted search result to the user.

3. A method comprising:

receiving a search request from a user in a network;
determining a search result for the search request, the search result comprising a set of resources;
determining, by a processor, a sub-set of the set of resources, where each resource in the sub-set was previously shared by at least one other user in the network and how recently each resource in the sub-set was shared by the at least one other user, where a first user shares a resource in the sub-set by directly addressing a second user;
weighting the sub-set of the set of resources as having a higher relevance than other resources of the search result to generate a weighted search result; and
weighting the sub-set of the set of resources in view of how recently each resource in the sub-set was shared; and
providing the weighted search result to the user.

4. A method comprising:

receiving a search request from a user in a network;
determining a search result for the search request, the search result comprising a set of resources;
determining a context for the network based on network sharing activity between users in the network;
determining, by a processor, a sub-set of the set of resources, where each resource in the sub-set matches the context for the network and was previously shared by at least one other user in the network, where a first user shares a resource in the sub-set by directly addressing a second user;
weighting the sub-set of the set of resources in view of how recently each resource in the sub-set was shared to generate a weighted search result; and
providing the weighted search result to the user.

5. A method comprising:

identifying a search request from a user in a network;
receiving a search result for the search request, the search result comprising a set of resources;
determining, by a processor, a sub-set of the set of resources, where each resource in the sub-set was previously shared by at least one other user in the network, where a first user shares a resource in the sub-set by directly addressing a second user;
weighting the sub-set of the set of resources, in view of how recently each resource in the sub-set was previously shared, as having a higher relevance than other resources of the search result to generate a weighted search result; and
providing the weighted search result to the user.

6. A method comprising:

identifying a search request from a user in a network;
receiving a search result for the search request, the search result comprising a set of resources;
determining, by a processor, a sub-set of the set of resources, where each resource in the sub-set was previously shared by at least one other user in the network and how recently each resource in the sub-set was shared by the at least one other user, where a first user shares a resource in the sub-set by directly addressing a second user;
weighting the sub-set of the set of resources as having a higher relevance than other resources of the search result to generate a weighted search result;
weighting the sub-set of the set of resources in view of how recently each resource in the sub-set was shared, and
providing the weighted search result to the user.

7. A method comprising:

identifying a search request from a user in a network;
receiving a search result for the search request, the search result comprising a set of resources;
determining a context for the network based on network sharing activity between users in the network;
determining, by a processor, a sub-set of the set of resources, where each resource in the sub-set matches the context for the network and was previously shared by users in the network, where a first user shares a resource in the sub-set by directly addressing a second user;
weighting the sub-set of the set of resources, in view of how recently each resource in the sub-set was previously shared, as having a higher relevance than other resources of the search result to generate a weighted search result;
providing the weighted search result to the at-least-one user.

8. The method of claim 1, further comprising actively monitoring sharing activity of the users in the network.

9. The method of claim 1, further comprising passively monitoring sharing activity of the users in the network.

10. The method of claim 1, further comprising filtering the set of resources based on a profile of the user.

11. The method of claim 1, further comprising filtering the set of resources based on an age of the user.

12. The method of claim 1, further comprising:
determining a location of the user; and
filtering the set of resources based on the location of the user.

13. The method of claim 1, further comprising filtering the set of resources based on a type of content in the set of search results.

14. The method of claim 1, further comprising providing information indicating a strength of relevance of the set of resources that was weighted.

15. The method of claim 1, wherein the first user directly addresses the second user by at least one of an email address or a short nickname to share the resource in the sub-set.

16. The non-transitory computer-readable storage medium of claim 2, wherein the first user directly addresses the second user by at least one of an email address or a short nickname to share the resource in the sub-set.

17. The method of claim 3, further comprising actively monitoring sharing activity of the users in the network.

18. The method of claim 3, further comprising passively monitoring sharing activity of the users in the network.

19. The method of claim 3, further comprising filtering the set of resources based on a profile of the user.

20. The method of claim 3, further comprising filtering the set of resources based on an age of the user.

21. The method of claim 3, further comprising:
 determining a location of the user; and
 filtering the set of resources based on the location of the user.

22. The method of claim 3, further comprising filtering the set of resources based on a type of content in the set of resources.

23. The method of claim 3, further comprising providing information indicating a strength of relevance of the set of resources that was weighted.

24. The method of claim 3, wherein the first user directly addresses the second user by at least one of an email address or a short nickname to share the resource in the sub-set.

25. The method of claim 4, further comprising actively monitoring the network sharing activity of the users in the network.

26. The method of claim 4, further comprising passively monitoring the network sharing activity of the users in the network.

27. The method of claim 4, wherein the higher relevance is also based on a time of the network sharing activity relative to a time of the search request.

28. The method of claim 4, further comprising filtering the set of resources based on a profile of the user.

29. The method of claim 4, further comprising filtering the set of resources based on an age of the user.

30. The method of claim 4, further comprising:
 determining a location of the user; and
 filtering the set of resources based on the location of the user.

31. The method of claim 4, further comprising filtering the set of resources based on a type of content in the set of search results.

32. The method of claim 4, further comprising providing information indicating a strength of relevance of the search results that was weighted.

33. The method of claim 4, wherein the first user directly addresses the second user by at least one of an email address or a short nickname to share the resource in the sub-set.

34. The method of claim 5, wherein the first user directly addresses the second user by at least one of an email address or a short nickname to share the resource in the sub-set.

35. The method of claim 6, wherein the first user directly addresses the second user by at least one of an email address or a short nickname to share the resource in the sub-set.

36. The method of claim 7, wherein the first user directly addresses the second user by at least one of an email address or a short nickname to share the resource in the sub-set.

* * * * *